United States Patent [19]

Ringens et al.

[11] Patent Number: 5,064,280

[45] Date of Patent: Nov. 12, 1991

[54] METHOD OF MEASURING THE VELOCITY AND/OR LENGTH OF ENDLESS WEBS OF TEXTILE MATERIAL AND APPARATUS FOR CARRYING OUT THE METHOD

[75] Inventors: Werner Ringens, Krefeld-Forstwald; Franz J. Schmitz, Krefeld; Eckhard Schollmeyer, Kempen, all of Fed. Rep. of Germany

[73] Assignee: Deutsches Texilforschungs-zentrum Nord West e.v.

[21] Appl. No.: 276,327

[22] PCT Filed: Mar. 15, 1988

[86] PCT No.: PCT/DE88/00143

§ 371 Date: Jan. 16, 1989

§ 102(e) Date: Jan. 16, 1989

[87] PCT Pub. No.: WO88/07208

PCT Pub. Date: Sep. 22, 1988

[30] Foreign Application Priority Data

Mar. 18, 1987 [DE] Fed. Rep. of Germany ....... 3708773
Mar. 2, 1988 [DE] Fed. Rep. of Germany ....... 3806608

[51] Int. Cl.$^5$ .............................................. G01S 17/58
[52] U.S. Cl. .................................... 356/28.5; 356/429
[58] Field of Search ................... 356/28, 28.5, 429; 250/559-561

[56] References Cited

U.S. PATENT DOCUMENTS 3,517,998  6/1970  Pryor .
4,126,392  11/1978 House .
4,181,432  1/1980  Flower ................................. 355/28
4,334,779  6/1982  Domey et al. ................... 356/28.5 X
4,679,932  7/1987  Morishita et al. ..................... 356/28
4,696,568  9/1987  Weistra ............................... 356/28.5

OTHER PUBLICATIONS

"A Laser Doppler Velocimeter for Surface Velocity Measurement", R. Saarimaa, J. Phys. E: Sci. Instrum., vol. 12, 1979.
Melliand Textilberichte, Band 51, No. 8, Aug. 1970, "Berührungslose Geschwindigkeits-und Wegmessung durch Laser-Doppler-System (LADAR)", p. 978.
P. A. Davies et al., "Reflection from a Transversely Moving Mirror-Experimental Details", Jour. of Physics E, Scient. Instr., pp. 245-248.

Primary Examiner—Mark Hellner
Attorney, Agent, or Firm—Andrus, Sceales, Starke & Sawall

[57] ABSTRACT

A method and an apparatus for measuring the velocity and/or length of endless webs of textile goods are described. The textile web is irradiated with a light beam of which one deflects a first portion prior to impinging on the surface of the textile web and one directs the deflected light beam to evaluation means. The light beams reflected from the surface of the textile web are directed through a convex lens and are also directed to the evaluation means so that the corresponding light beams are superimposed. The velocity and/or the length of the web of textile goods are determined from the frequency of the interference formed by the superposition of the light beams.

27 Claims, 5 Drawing Sheets

METHOD OF MEASURING THE VELOCITY AND/OR LENGTH OF ENDLESS WEBS OF TEXTILE MATERIAL AND APPARATUS FOR CARRYING OUT THE METHOD

The present invention concerns a method of measuring the velocity and/or length of endless webs of textile material and an apparatus for carrying out this method.

Normally, in the textile industry the velocities or lengths of conveyed endless webs are measured according to the mechanic rolling method. According to this method a measuring wheel which is connected to a speedometer is brought into contact with the respective web which has to be measured. This web is for instance a two-dimensional structure or a yarn. Furthermore, it is known to connect the measuring wheel to a deflection roller at which the endless web is deflected in order to determine in such a manner the velocity of the transported web which is in contact with the deflection roller by measuring the velocity or the number of revolutions of the deflection roller.

However, the above-described mechanic rolling method can cause a number of problems. So, for instance, with sensitive webs the danger exists that the surface of the web is damaged by the positioning of the measuring wheel which, for instance, results in a surface roughening linearly extending in the running direction of the web or in displaced spots. The application of the measuring wheel can result in a deformation in this area especially with elastic articles, as for instance knitted fabrics, which brings along corresponding faulty measurements of the length of the web. The above-described second method according to which the web velocity or the web length is derived from the velocity of the deflection roller or its number of revolutions brings along the danger of faulty measurements, too. So, for instance, by this slippage effects between the web and the deflection roller which substantially influence the results of the measurements cannot be excluded. This is especially then the case if wet webs are conveyed over such a deflection roller or if the web makes necessary an especially smooth and polished deflection roller due to its sensitivity with regard to mechanical stresses.

It is the object of the invention to provide a method and an apparatus of the cited kind with which an especially exact measurement of the velocity and/or the length of running webs is possible.

This object is achieved by a method having the characterizing features of the claims and by an apparatus having the characterizing features of the claims.

The inventive method is based on the fundamental idea to not carry out the measurement of the velocity or of the length of the running web by direct contact of a measuring wheel with the web or by deflecting the web over a deflection roller the velocity or number of revolutions of which is determined, as this is the case with the above-cited prior art. The inventive method rather proposes a direct and contact-free measurement of the velocity or of the length of the web. According to this method, a light beam is directed to the running web wherein a portion of the light beam has been deflected before and has been supplied to evaluation means. Surprisingly, it could be observed that the beam impinging on the surface of the textile web is reflected by the surface such that a reflection area results which is still relatively narrow. This is surprising since one would have expected that the web would reflect in all directions, scatter and/or adsorb the directed light beam on account of the plurality of reflection areas of such a surface and of the adsorption characteristics of the web so that a reflection area would result which cannot be exactly evaluated. As already stated above, this does not result with the inventive method so that a selected portion of the light beams from the reflection area can be directed through a convex lens and can be superimposed with that portion of the light beam which has been deflected before. By this, various Doppler frequencies, i.e. interferences, result in response to the respective velocity of the web which have the result of intensity variations of the light beam. Evaluation means which receive the superimposed light beams determine the velocity of the web from the interferences according to the following formula:

$$f_g = \frac{2v \cdot \cos\alpha}{\lambda}$$

wherein the factors have the following meaning:
f the determined interference,
v the velocity of the web,
α the irradiation angle and
λ the wavelength of the light beam.

From the above equation the following equation results for the web length 1 transported in the time unit t:

$$l = v\,t = \frac{n\lambda}{2\cos\alpha}$$

wherein n is the number of the counted Doppler oscillations within the time t.

With the inventive method a single light beam or preferably a bundle of light beams of the same wavelength can be used. Accordingly, the used term "light beam" covers not only a single light beam but also a corresponding bundle of monochromatic light beams.

The above-described inventive method has the advantage that it guarantees a very exact measurement of the velocity and/or length of the web since the propagation velocity of the light beam relative to the velocity of the web is higher by about a plurality of powers of ten so that no measuring errors can result by this. So, for instance, it could be observed that the measuring error could be significantly reduced compared with the known methods, i.e. it was only 1/100 to 1/1000 of the original measuring error. Furthermore, with the inventive method the above-described problems which result from the use of a measuring wheel which is in contact with the web no longer exist since, due to the contact-free measurement, no undesired displacements of the thread systems, roughenings or other mechanical damages of the surface of the web can take place. The inventive method measures uniformly and reproducibly the velocity or the length of the web independetly of the respective condition thereof, i.e. independently of the fact whether the web is dry or wet. Furthermore, the method can be used especially well for controlling the velocity of the web, due to its high reproducibility and exactness, as is explained in detail in connection with an example of the apparatus.

On principle, every light beam can be used with the inventive method provided the light beam is monochromated prior to the superposition of the deflected and reflected light beam. However, it is easier to use a light source which generates a monochromatic light beam. Especially good results are achieved if one uses a laser beam or, as already mentioned above, a bundle of laser beams. Here, it is no more necessary to monochromate the light beam since the laser automatically generates light beams of only one wavelength. For this the known lasers can be used as light source, as for instance inert gas lasers, He-Ne-lasers or $CO_2$ lasers, as is explained in connection with the apparatus.

As regards the irradiation angle, it has to be noted that the same can vary between about 20° and 89.5° or about 160° and 90.5°, preferably in a range of between about 80.5° or about 100° and 90.5°, relative to the running direction of the web. The preceding preferred irradiation angle range (slightly less than 90° or slightly larger than 90°) allows the use of relative small convex lenses since with increasing or decreasing size of the irradiation angle, i.e. with angles of between about 20° and about 70° or 160° and 110°, correspondingly large convex lenses are necessary which cause higher costs and enlarge the apparatus in its volume. Especially small lenses for the concentration of the reflected light beam can be used if the surface of the web is irradiated with irradiation angles of between 89.5° and 89.9° or 90.1° and 90.5°. These irradiation angles are to be used especially for cases when very high web velocities are to be measured. In this connection it has to be noted that the inventive method cannot be used with irradiation angles of 90° since with such an irradiation angle no frequency difference between the deflected and the reflected light beam and thus no intensity variation results due to the missing velocity component in the direction of irradiation.

Especially good results can be achieved if one selects irradiation angles of 86.5° or 93.5° relative to the running direction of the web. So, it was observed that with such an irradiation angle the measuring result is not influenced or is influenced only in a negligible manner by flutter movements of the web perpendicularly with respect to the running direction. This is important since such flutter movements are especially caused if the web is transported with a relatively high velocity, i.e. with velocities of between about 20 m/min and about 80 m/min, or over greater distances without any additional support, as this is frequently the case with production machines. In such cases one can achieve very exact and reproducible measuring results if the measurement is carried out at locations at which the web is supported by a deflection roller and the web is transported not only in web running direction but also simultaneously perpendicularly to the running direction due to an unbalance of the deflection roller. Thus, it has to be noted that with an irradiation angle of 86.5° or 93.5° relative to the running direction of the web the above-described flutter movements or movements of the web perpendicularly with respect to the running direction of the web can be eliminated in such a manner that they have no influence or have only a negligible influence on the measurement of the length or velocity of the web.

With respect to the intensity, energy or capacity of the used light beam, it has to be stated that limits are predetermined by the substrate and the processing condition of the web since no undesired modifications of the material, as for instance fusing of the web surface or destruction of the dyes, are to result on account of the measuring method. So, light beams having a capacity density of about 4 mW/cm$^2$ up to about 15 mW/cm$^2$ have had an especially advantageous effect since herewith no undesired modifications of the above-cited kind are caused.

In order to achieve an especially reproducible measurement free of undesired noise effects, a further embodiment of the inventive method resides in adapting the intensity of the deflected light beam to the intensity of the light beam reflected from the web surface of the textile material prior to its feeding to the evaluation means. This results in the superposition of light beams (deflected and reflected light beam) having approximately the same intensity so that the frequency of the interference caused by this superposition and thus also the respective velocity or length of the web can be determined especially exactly.

Such an intensity adaption of the deflected light beam to the intensity of the light beam reflected from the web surface can be achieved by partly reflecting the deflected light beam at suitable reflection means and/or partly absorbing the same prior to its feeding to the evaluation means so that only the reflected and/or non-absorbed portion of the deflected light beam is superimposed with the light beam reflected from the web surface, as this is still explained in detail in connection with the apparatus. Such a method enables also the measurement of velocities or lengths of webs of such materials which, for instance due to its colouring, absorb a large portion of the light beam impinging on the web surface or which, on account of their micro structure or macro structure, i.e. their roughness, have a relatively broad reflection area which can be evaluated only with difficulty.

The inventive apparatus for carrying out the above-described method comprises a light source serving for the generation of the light beam. A beam dividing means is located between the light source and the web, said beam dividing means deflecting from the light beam a first portion which is used as reference beam in the above-described method. This beam dividing means is known to the expert in the art and, for instance, deflects the reference beam necessary for the measuring method by means of a prism and lets pass a second portion of the light beam through the beam dividing means without being influenced. A convex lens is located between the beam dividing means and the web, said convex lens concentrating selected reflected light beams from the lobe like reflection area. Furthermore, evaluation means are provided comprising a photo detector and signal processing means. The selected and concentrated reflected beams superimposed by the reference beam are directed to the photo detector so that the same transforms the Doppler frequency of the interference or the intensity variations of the light beam superimposed by the reference beam into an electric signal.

Preferably, the light source is a laser on account of the above-cited reasons. Especially, the laser is an inert gas laser, particularly a He-Ne-laser having a light capacity of between about 2 mW and about 8 mW which irradiates laser beams having a wavelength of 632.8 nm. Such an inert gas laser can also be replaced by a $CO_2$ laser or solid-state laser having a corresponding capacity and known to the expert in the art wherein these lasers generate light beams as continuous beams.

In an especially suited embodiment the photo detector has a measuring area of <1 mm$^2$, preferably of about 0.2 mm$^2$ up to about 0.5 mm$^2$. Such photo detectors, especially such having a measuring area of about 0.2 mm$^2$, enable an optimization of quantum yields compared with diodes having larger measuring areas so that the same are larger than about 50% at wavelengths of about 600 nm while diodes having measuring areas >1 mm$^2$ enable quantum yields of only about 20%. By this, it is assured that also light beams reflected from the web surface with relatively low intensity can be evaluated without any difficulties wherein there is no danger that the measurement is disturbed by the noise caused by the signal processing means, especially in the low frequency range of between about 500 Hz and about 1000 kHz. This has the result that Doppler signals with little noise can be evaluated at high signal amplification.

Especially good results can be achieved with an inventive apparatus which includes as photo detector either a p-i-n-type diode or a silicone avalanche diode. Especially the silicone avalanche photo diode has an essentially better quantum yield and a higher resolution in the wavelength range of between about 500 nm and about 900 nm while the p-i-n-type diode is better than the silicone avalanche photo diode in the range of between about 900 nm and about 1000 nm, as this can be taken from the comparison in FIG. 6 which is described in the following. An especially high frequency resolution can be achieved with barrier layer photo detectors which function in a frequency range of between about 500 Hz and about 1000 kHz, wherein a frequency range around about 500 Hz is especially advantageous for the inventive method or the inventive apparatus. On account of the tuning of the blocking voltage and on account of the inner amplification the signal-noise-ratio can be adapted to the respective application, i.e. to the macro structure and/or micro structure of the web (roughness) and/or colour.

Furthermore, it has to be stated that the design of the convex lens which is located between the beam dividing means and the web has an essential influence on the exactness of the measurement. Especially suited are convex lenses the focus of which lies between about 40 mm and about 60 mm, preferably at about 50 mm, and the diameter of which is less than 25 mm, preferably at about 19 mm. With such a convex lens also the velocity or length of relatively narrow webs can be detected.

An especially suitable embodiment of the inventive apparatus comprises reflection means which are located in the beam path of the deflected light beam prior to the evaluation means. The reflection means has the effect that the intensity of the deflected light beam can be adapted to the intensity of the light beam reflected from the web surface such that only a portion of the deflected light beam is superimposed with the reflected light beam for generating the interference which has to be evaluated for the measurement. In the simplest case this reflection means consists of a glass pane which is located in the beam path of the deflected light beam so that it reflects only a portion of the deflected light beam to the photo detector. If an apparatus is used according to which the beam dividing means is formed as beam dividing tube, an interface of the beam dividing tube can serve as reflection means. During the transition of the deflected light beam from the glass into the air a reflected part beam develops which is superimposed as a reference beam with the light beam reflected from the web surface.

Furthermore, there is the possibility to provide an absorption means instead of the reflection means or in addition to the reflection means wherein in the simplest case the interface described before is provided with an absorption filter. This absorption means has the effect that only a portion of the deflected light beam is fed to the measurement and prevents at the same time through absorption that the non-reflected portion of the deflected light beam falsifies the measurement result. On principle, any material which adsorbs the portion of the deflected light beam that passes through the interface is suited for such an adsorption filter located on the interface of the beam dividing cube. Especially good results can be achieved with an adsorption filter consisting of black velours and located from outside on the corresponding interface.

According to another embodiment of the inventive apparatus the adsorption means is formed as a linear circular transmission graduated filter. Such a filter allows the adaptation of the intensity of the deflected light beam to the intensity of the light beam reflected from the web surface in an especially simple manner wherein the intensity can be adjusted in a range of between 0% and 100%. By this, in an especially simple manner the inventive apparatus can be adapted to the macro structure and micro structure and colour of the web which has to be measured.

In the inventive apparatus the signal processing means is directly coupled to the photo detector. This signal processing means, in the simplest case, consists of an oscilloscope which displays the interference generated by the superposition of the light beams and/or counts the Doppler frequency. A counting of the Doppler frequency (interference frequency) is necessary for the quantitative evaluation of the velocity or length of the web in accordance with the above-mentioned formulas. However, if one wishes to determine the velocity of the web at a plurality of locations with the inventive method which, for instance, is especially advantageous for the tuning of various drive motors in a machine, or if one wishes to tune the velocity of several webs, it is sufficient in the simplest case to display the respective interference at the corresponding measurement location or the respective interference of the corresponding web on the oscilloscope and to compare it with a predetermined interference and to manually correct the corresponding drive motor of the web if a deviation occurs. Of course, such a correction can be carried out automatically. Here, the signal processing means generates an output signal which is used for the control of the speed of the drive motors for other web locations or the drive motors for the other webs if a predetermined value is fallen short of or is exceeded, said value, for instance, is predetermined by the web velocity at a selected location or for the case of the determination of several web velocities by the velocity of a selected web.

According to the above-described application of the inventive method for the control of the velocity of a web at a plurality of locations or for tuning the velocity of a plurality of webs, an embodiment of the inventive apparatus is used having a corresponding number of light sources, beam dividing means, convex lenses as well as evaluation means dependent on the locations which have to be controlled with one web or dependent on the number of webs if the velocities of a plurality of webs are to be synchronized. Here, the evaluation means comprise a number of photo detectors and signal evaluation circuits corresponding to the locations or webs. If a manual tuning of the velocities is carried out, the signal processing circuits can consist of an oscilloscope having a corresponding number of inputs so that the signals generated by the photo detectors can be displayed on the screen of the oscilloscope and thereafter the drive motors can be independently controlled. According to such an automatic control the signal processing circuits generate a number of output signals corresponding to the number of measuring locations which are used for the control of the speed of the corresponding drive motors, respectively.

An especially suited embodiment of the inventive apparatus which is especially suited for an industrial measurement is formed as compact unit. This embodiment has an elongated housing which is preferably closed on all sides and which has coupling means for the light source at its front-sided end. The coupling means is formed such that it is adapted to be coupled to the light source either directly or through a optical fiber located between the light source and the housing. A light beam inlet and outlet aperture, preferably the above-described convex lens, is located at the front side which is opposite to the coupling means. Through this aperture the measuring beam leaves the housing, and the light beam reflected from the web surface re-enters the housing through this aperture. The beam dividing means, possibly the reflection means for the deflected light beam as well as the signal processing circuit are located within the housing.

In order to enable a simple adjustment of the focus of the convex lens on the web surface, a further embodiment includes additionally a flanged tube at the front side opposite to the coupling means, said tube holding the convex lens such that it is adapted to be displaced in the direction to the web surface or oppositely. For instance, this can be achieved by designing the tube in a telescope-like manner or providing the same with a corresponding screw thread. The tube can also be removably connected to the housing so that, dependent on the respective measuring problem, the tube and the convex lens firmly connected therewith can be simply and quickly replaced by another tube and another corresponding convex lens.

In order to reduce the size of such an embodiment and to provide a compact measuring apparatus, according to a further embodiment one can provide three plane deflection mirrors feeding the deflected light beam to the photo detector. These plane deflection mirrors are located parallel with respect to the light beam generated by the light source.

Furthermore, with such embodiments using a beam dividing cube, an interface for the reflection and/or adsorption of the deflected light beam can be used so that two plane deflection mirrors can be renounced with compared with the above-described embodiment, as this is still explained in detail in connection with an example.

Preferred embodiments of the inventive method and of the inventive apparatus are indicated in the dependent claims.

The inventive apparatus is described in the following in connection with the examples and with the drawing. In the drawing.

Figure 1:
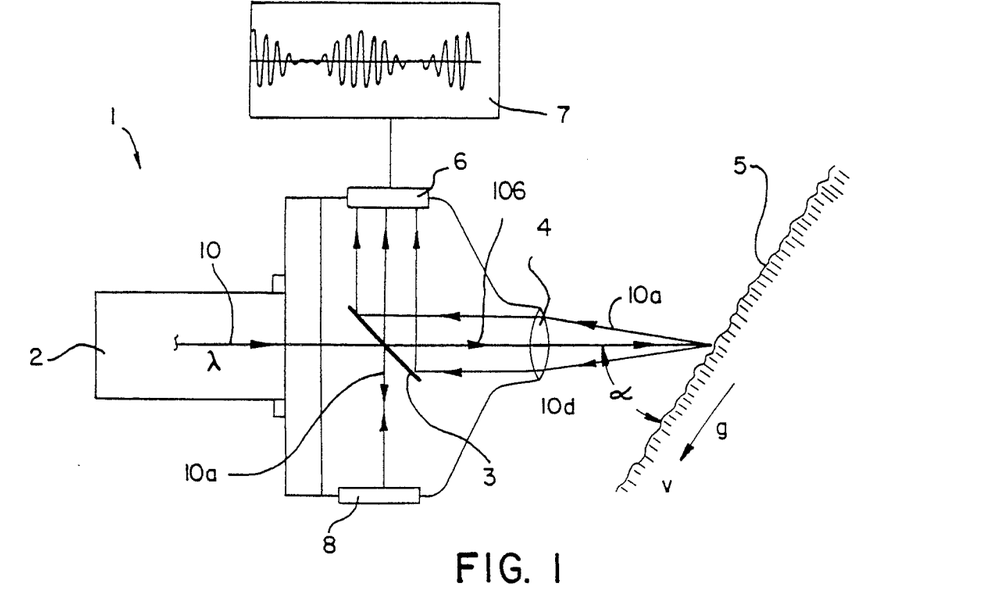
FIG. 1 is a schematic representation of a first embodiment of the apparatus.

The apparatus for measuring the velocity and/or length of a web which has the reference number 1 in FIG. 1 includes a light source 2 directing a monochromatic light beam or a bundle of monochromatic light beams to the surface of a web 5. The light beam has a constant wavelength $\lambda$. According to the embodiment shown in FIG. 1 the light source 2 is a He-Ne-laser wherein the laser beam 10 has a wavelength of 632.8 nm and a light capacity of 3 mW. A portion 10a of the light beam 10 is deflected at a beam dividing means 3 which is formed as beam dividing cube to a reflection means 8 wherein the reflections means 8 is formed as adjustable plane plate. Due to the partial transparency of the plane plate 8 the intensity of the light beam 10a can be adapted to the intensity of the light beams reflected from the web surface whereby the measuring exactness and reproducibility of the apparatus can be improved. The other portion 10b of the light beam is directed by a convex lens 4 at a certain irradiation angle $\alpha$ to the surface of the web 5 which is transported with a certain velocity v in the direction of the arrow 9. The focus of the convex lens 4 is adjusted to the surface of the web. From the surface of the web 5 the light beam 10b is reflected in a lobe-like manner wherein two reflection beams 10c and 10d which are only examplarily shown are directed through the lens 4 and are deflected by the beam dividing means and are superimposed with the light beam 10a reflected by the plane plate 8. Dependent on the web velocity v a variable Doppler frequency $f_d$ develops which is detected by means of a photo detector 6 onto which the light beams 10a, 10c and 10d are directed and is transformed there into an electric signal which is shown on the screen as an interference by a signal processing circuit 7 which is an oscilloscope in the embodiment shown in FIG. 1.

The second embodiment of the apparatus shown in FIG. 2 comprises, as already explained in connection with the embodiment of the apparatus of FIG. 1, a light source 2 generating a light beam 10 having a constant wavelength $\lambda$ wherein this light source is also a laser. A portion of the light beam 10a is deflected to a reflection means 8 by a beam dividing means. The reflection means 8 is formed as adjustable plane plate. The reflected portion of the light beam 10a is reflected to the first reflection means 8 by a second reflection means 8a which is formed as adjustable plane deflection mirror and is deflected therefrom to the photo detector 6 by means of a third reflection means 8b. The intensity of the deflected light beam 10a can be optimally adapted to the intensity of the light beam reflected from the web surface through such a deflection and reflection of the light beam portion 10a by means of the adjustable reflection means 8, 8a and 8b whereby the measuring exactness of the apparatus is significantly improved. Another portion 10b of the light beam 10 passes the beam dividing cube 3 and arrives through a lens 4 at the surface of the web 5 to be measured which is transported with a certain velocity v which is to be measured in the direction of the arrow 9. The irradiation angle α is in the present case 86.5°. A portion of the light beam 10b is reflected in a lobe-like manner from the surface of the web wherein two, only examplarily shown reflection beams 10c and 10d are directed through the lens 4. The web 5 is located in the focus of the convex lens 4. The reflected light beams 10c and 10d are deflected to the third reflection means 8b by the beam dividing cube 3 and are there superimposed with the corresponding portion of the light beam 10a. Dependent on the velocity v of the web a Doppler frequency $f_d$ of different size develops which is detected by means of a photo detector 6 onto which the light beams 10c and 10d as well as the part beam 10a are directed and which is transformed there into corresponding electric signals which are processed by the signal processing circuit 7 corresponding to the manner as schematically shown in FIG. 2.

Figure 2:
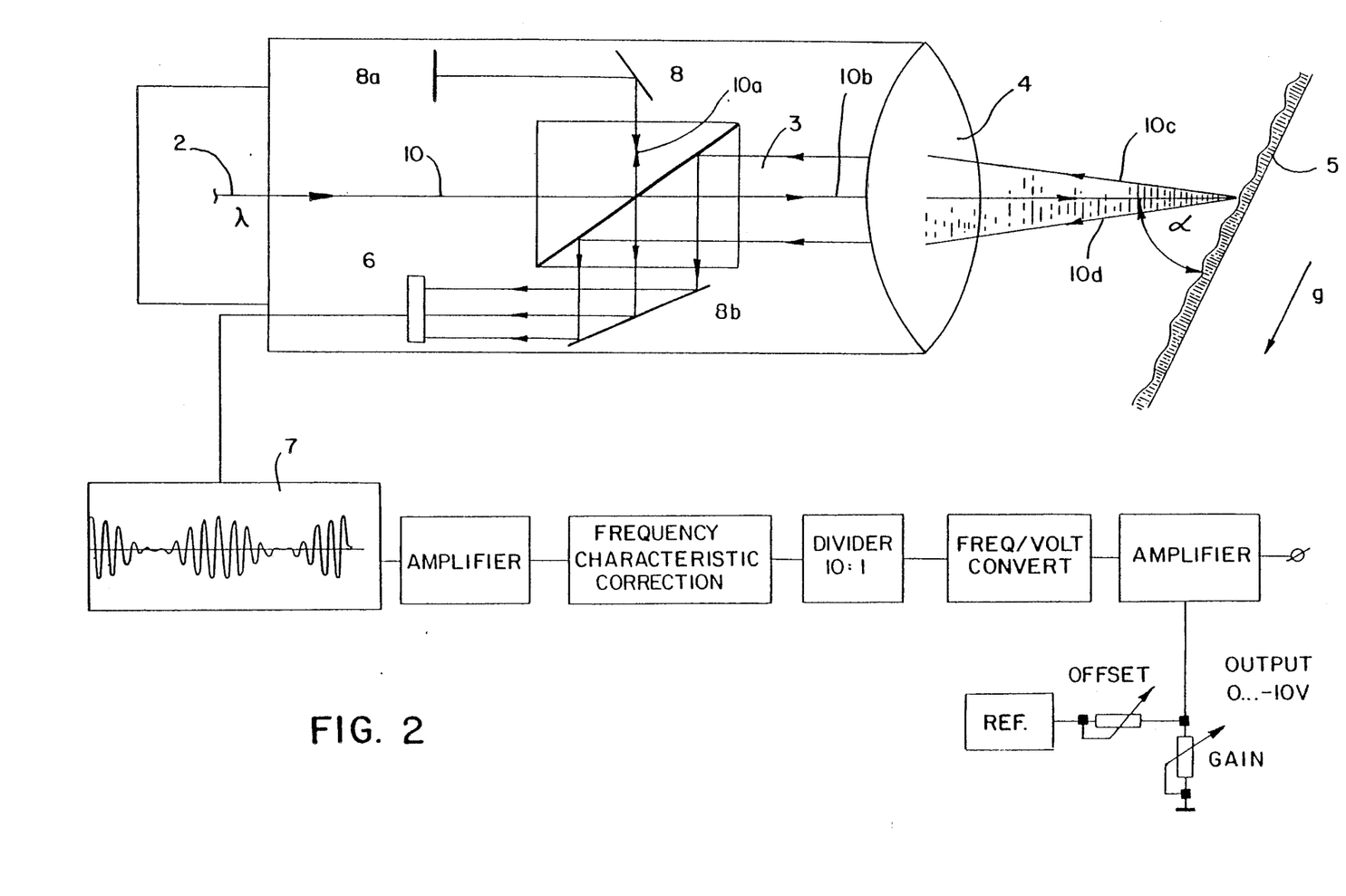
FIG. 2 is a schematic representation of a second embodiment of the apparatus.
Figure 3:
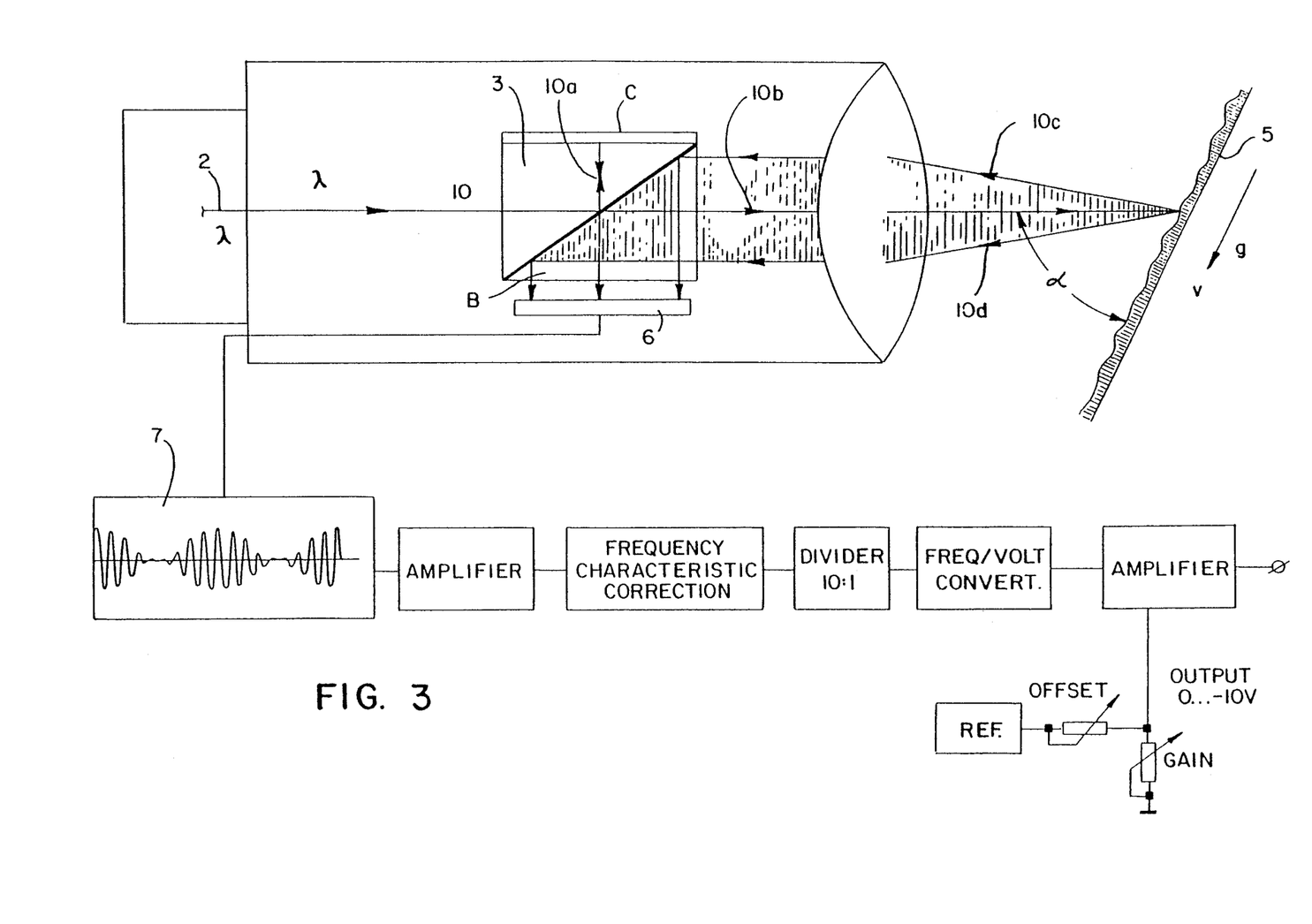
FIG. 3 is a schematic representation of a third embodiment of the apparatus.

The embodiment of the apparatus for measuring the velocity and/or length of webs as shown in FIG. 3 differs from the embodiment shown in FIG. 2 by the feature that the part light beam 10a branched from the light beam 10 is partially reflected at an interface A during the glass-air-transition such that a part light beam develops which has a significantly reduced intensity which, however, has the original light beam frequency or laser frequency. In order to prevent an undesired back irradiation of the portion of the light beam 10a which was not reflected at the interface A from outside of the beam dividing cube 3 into the beam dividing cube, the interface A is provided with an adsorption filter C. This adsorption filter consists of a metal plate provided with black velours. The portion of the light beam 10a reflected from the interface A is superimposed with the light beams 10c and 10d reflected from the web surface within the beam dividing cube and is fed to the measuring area of an avalanche diode 6 which is located below an interface b of the beam dividing cube 3 which detects the developing Doppler signal. Such an embodiment has the advantage that it is very small and compact. In other respects, the embodiment shown in FIG. 3 has the same structure and the same function as the above-described embodiment according to FIG. 2. For clarification purposes the same reference numbers have been used for the same members.

Instead of the adsorption filter C a linear circular transmission graduated filter can be used either by which the intensity of the portion of the light beam 10a necessary for the measurement can be optionally varied in a range of between 0.1% and 100%. By this it is achieved that the intensity of the deflected light beam portion 10a can be adapted to the intensity of the reflected light beams 10c and 10d dependent on the respective measuring problem, i.e. the macro structure or the micro structure, and thus to the reflection characteristics of the web surface in a simple and fast manner.

Figure 4:
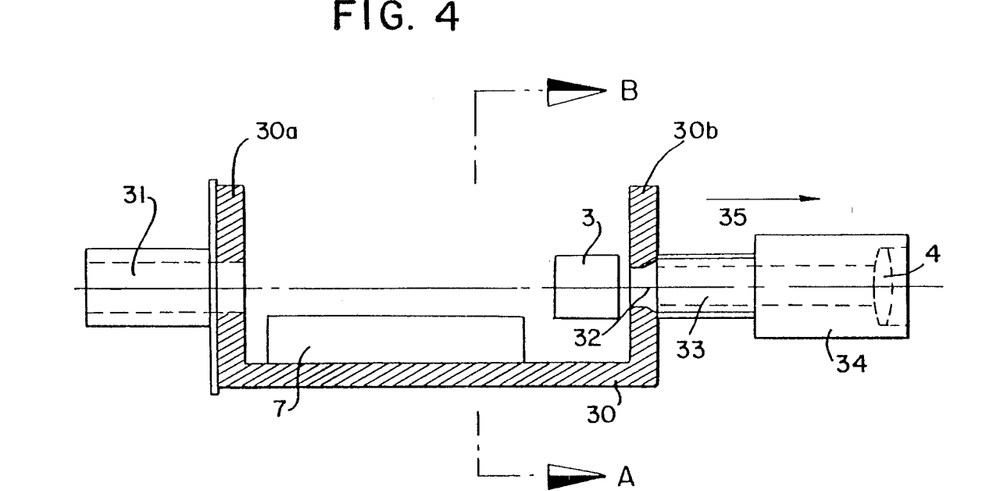
FIG. 4 is a side view of an apparatus with compact design.
Figure 4A:
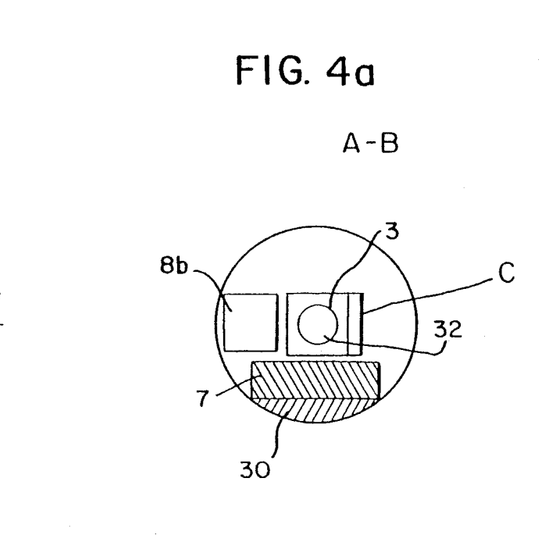
FIG. 4a is a sectional view along line A-B of the embodiment shown in FIG. 4.
Figure 4B:
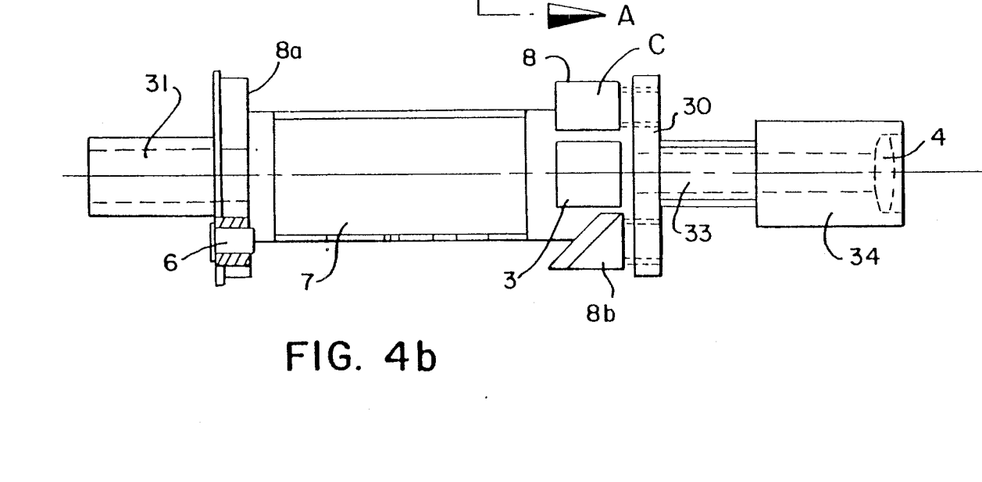
FIG. 4b is a top view of the embodiment according to FIG. 4.

Another embodiment of the inventive apparatus which is a compact unit is shown in FIGS. 4, 4a and 4b. According to this embodiment the beam dividing means 3 formed as beam dividing cube, the reflection means 8b (FIG. 4b), the adsorption means C (FIG. 4b), the photo detector 6 and the signal processing circuit 7 are located in a housing 30. The sleeve-like housing 30 has at its front side 30a a coupling means 31 by which the housing can be connected to a light source which is not shown either directly or by means of a correspondingly formed fiber optic. A light beam outlet and inlet aperture 32 is provided at the opposite front side 30b. This is joined by a peg-like tube 33 which supports holding means 34 for the convex lens 4 displaceably in the direction of the arrow 35 or vice versa. Preferably, the housing 30 is closed in order to protect the relatively sensible measuring optic 3, 8b, C, 6 and 7 from dirt and damage.

Figure 5:
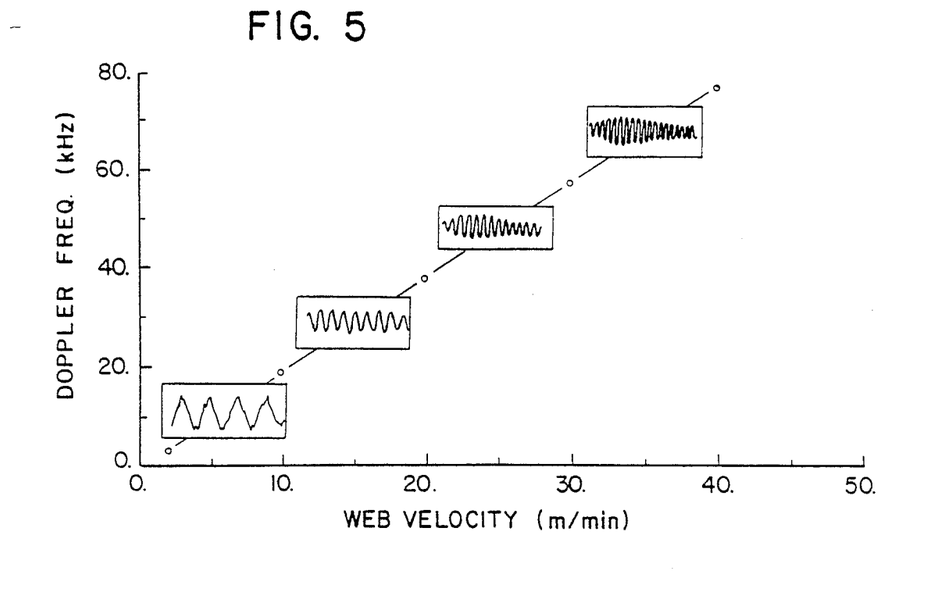
FIG. 5 is a graph of the Doppler frequency in relation to the web velocity.

In FIG. 5 the Doppler frequency for a selected web is shown in its relation to the velocity of the web. In this graph typical oscillograms are shown for certain velocities of the measured web wherein the Doppler frequency f is correspondingly increased with increasing web velocity. In connection with the measurement according to FIG. 5 an irradiation angle of 86.5° was selected.

Figure 6:
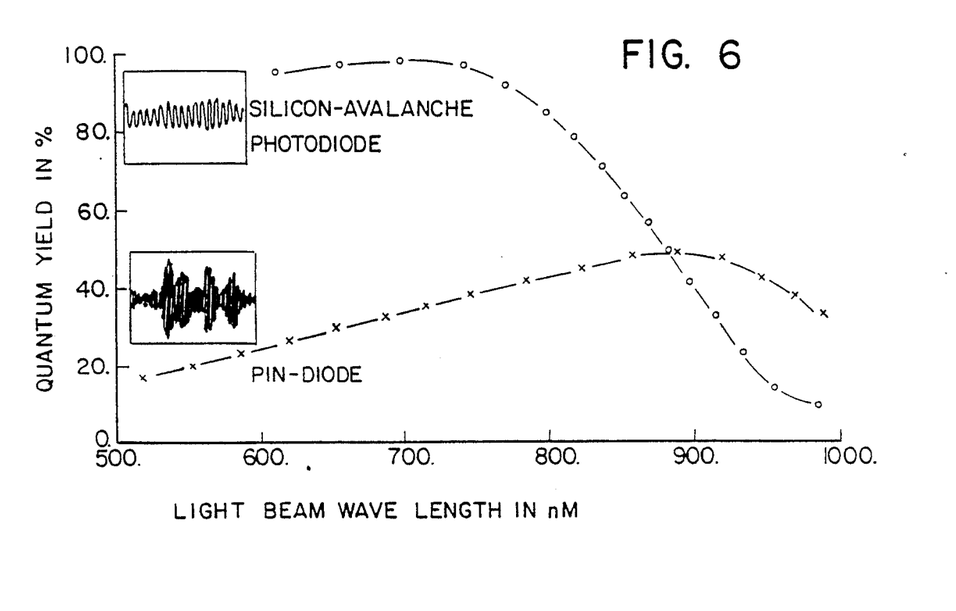
FIG. 6 is a graph of the quantum yield in relation to the wavelength of the light beam for two photo detectors.

FIG. 6 shows the quantum yield expressed in percentage in relation to the wavelength of the light beams for two typical photo diodes wherein the lower curve (up to 900 nm) corresponds to a p-i-n-type diode and the upper curve (up to 900 nm) corresponds to a silicone avalanche photo diode. As a comparison of the oscillograms also shown in FIG. 6 which have been made at a wavelength of the light beam of 632.8 nm and at a capacity of 3 mW shows, the resolution of the avalanche diode is better than that of the p-i-n-type diode at the above-cited wavelength. This is changed only at a wavelength of about 900 nm at which the p-i-n-type diode allows a higher quantum yield than the avalanche diode. From this it can be taken that the photo diode used has to be tuned to the wavelength of the light beam.

Figure 7:
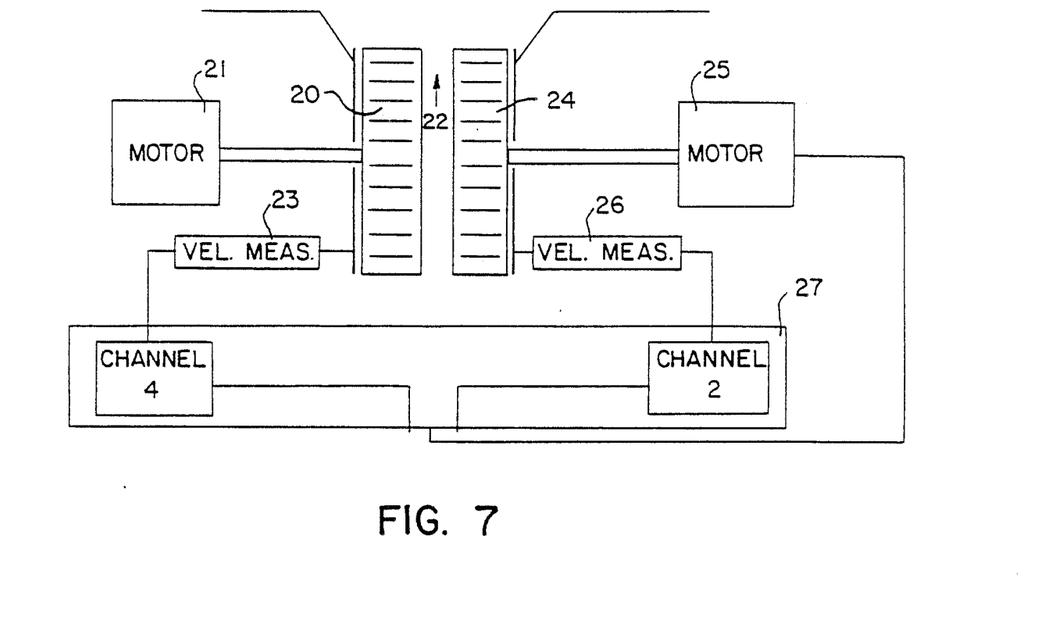
FIG. 7 shows the principle of a further embodiment of the apparatus which serves for the control of the velocities of two webs.

In FIG. 7 a further embodiment of the apparatus is schematically shown which allows an exact control of the velocities of two webs. Here, a first web 20 is transported in the direction of the arrow 22 by a drive motor 21 which can be optionally adjusted in its speed. The web 20 is associated with a first apparatus 23 which has a construction as described in connection with FIG. 1. A second web 24 is transported in the direction of the arrow 22 by means of a second drive motor 25. The second web 24 is associated with a second apparatus 26 which corresponds in its construction to the apparatus 23. As a difference with regard to the embodiment shown in FIG. 1, the apparatuses 23 and 26 do not have each a separate oscilloscope. A single oscilloscope 27 is rather provided which has two inputs which are designated in FIG. 7 with channel 1 and channel 2. Here, the apparatus 23 is connected to channel 1 and the apparatus 26 is connected to channel 2.

The above-described apparatus functions in the following manner:

The oscillogram recorded by the oscilloscope 27 by means of channel 1 and the apparatus 23 which, as shown in FIG. 2, has a certain form in response to the velocity of the web 20 is selected as a predetermined value, for example. Thereafter, after switching to channel 2 the velocity of the web 24 is shown on the oscilloscope in the form of an oscillogram by means of this channel and the apparatus 26. Also in this case this oscillogram which is associated with the velocity of the web 24 has a certain form. If an exact synchronism of the two webs 20 and 24 with respect to their velocities is desired, the velocity of the web 24 is varied until the oscillogram received by means of channel 2 corresponds in its form to the oscillogram shown by means of channel 1 and selected as a predetermined value. This is achieved by the feature that the drive motor 25 is a motor with variable speed and can be manually adapted to the velocity of the motor 21. Furthermore, there is the possiblity to compare the Doppler frequency $f_{d1}$ measured by means of channel 1 with the Doppler frequency $f_{d2}$ measured by means of channel 2 wherein the following equation is true with equal velocities of the web 20 and 24:

$$f_{d1} = f_{d2}.$$

Accordingly, if the velocities of the webs are different the two above-cited Doppler frequencies are also different.

Of course, it is also possible to tune more than only two web velocities. For this, a corresponding number of apparatuses 23 or 26 as well as a correspondingly designed signal processing circuit 27 are necessary.

The above-described apparatus can be used for instance in textile machines according to which two webs are simultaneously processed. This is also true for example for mercerizing machines or cylindrical driers so that two webs can be mercerized or dried one upon the other in synchronism or with different exactly determined velocities. Furthermore, it is possible to use the above-described apparatus with a web at different locations so that by this drive motors of a single machine or of successive machines are controlled and that the web tension significantly influencing the quality can be adjusted in an exact and reproducible manner which is not possible with the known measuring method on account of the above-described faults.

In addition to the above-described manual adjustment of the speed of the drive motor 25 it is also possible to design the signal processing circuit 27 such that it generates an output signal which is used for the control of the drive motor 25 if the Doppler frequency is different from a predetermined and/or measured Doppler frequency.

What is claimed is:

1. A method of measuring at least one of the velocity and length of an endless web of textile goods comprising the steps of:
   generating a beam of laser light having energy density of between 4 mW/cm$^2$ and 15 mW/cm$^2$;
   forming a reference light beam and a web irradiation light beam from the beam of laser light;
   irradiating the web of textile goods with the irradiation light beam;
   obtaining the light reflected from the web of textile goods and forming same into a reflected light beam;
   reducing the intensity of the reference light beam in accordance with the intensity of the reflected light beam by applying the reference light beam to a reflection means that reflects a portion of the applied light;
   applying, in superimposition, the reduced intensity reference light beam and the reflected light beam to a common photo detector; and
   determining from the frequency characteristics of the photo detector output at least one of the velocity and length of the web of textile goods.

2. The method according to claim 1 further defined as directing the beam of laser light to the web at an irradiation angle ($\alpha$), relative to the running direction of the web, of between about 20° and 89.5° or between about 90.5° and about 160°.

3. The method according to claim 2 further defined as directing the beam of laser light to the web at an irradiation angle ($\alpha$) of between about 80° and about 89.5° or between about 90.5° and about 100°.

4. The method according to claim 3 further defined as directing the beam of laser light to the web at an irradiation angle ($\alpha$) of 86.5° or 93.5°.

5. An apparatus for measuring at least one of the velocity and length of an endless web of textile goods comprising:
   a light source for generating a beam of laser light having an energy density of between 4 mW/cm$^2$ and 15 mW/cm$^2$;
   beam dividing means for forming, from said beam of laser light, a reference light beam and an irradiation light beam for irradiating the web of textile goods;
   means for forming the light reflected from the web of textile goods into a reflected light beam;
   means for reducing the intensity of the reference light beam in accordance with the intensity of the reflected light beam, said means comprising reflection means reflecting a portion of the light applied thereto; and
   evaluation means including a single photo detector means for receiving the reduced intensity reference light beam and the reflected light beam in superimposition, said evaluation means determining the frequency characteristics of the superimposed light beams for providing, from said frequecy characteristics, an indication of at least one of the velocity and length of the web of textile material.

6. The apparatus according to claim 5, characterized in that the laser is an inert gas laser.

7. The apparatus according to claim 6, characterized in that the laser is a He-Ne-laser.

8. The apparatus according to claim 5 characterized in that said photo detector has a measuring area for receiving the reference and reflected light beams of <1 mm$^2$.

9. The apparatus according to claim 8 characterized in that said photo detector has a measuring area of about 0.2 mm$^2$ to about 0.5 mm$^2$.

10. The apparatus according to claim 5 characterized in that said photo detector is an avalanche photodiode.

11. The apparatus according to claim 10 characterized in that said photo detector is a silicon avalanche photodiode.

12. The apparatus according to claim 5 characterized in that the photo detector is a barrier layer photo detector having a high, frequency resolution in the range of about 500 Hz up to about 1000 kHz.

13. The apparatus according to claim 12 characterized in that the barrier layer photo detector has a high, frequency resolution in the range of about 500 Hz.

14. The apparatus according to claim 5 characterized in that said means for forming the light reflected from the web into a reflected light beam includes a convex lens.

15. The apparatus according to claim 14 characterized in that said convex lens has a focal length of between about 40 mm and about 60 mm.

16. The apparatus according to claim 15 characterized in that said convex lens has a focal length of about 50 mm.

17. The apparatus according to claim 14 characterized in that said convex lens has a diameter of less than 25 mm.

18. The apparatus according to claim 17 characterized in that said convex lens has a diameter of about 19 mm.

19. The apparatus according to claim 14 wherein said convex lens is so positioned with respect to said beam dividing means that the irradiation light beam passes through said convex lens.

20. The apparatus according to claim 5 wherein said reflection means includes light absorption means.

21. The apparatus according to claim 5 wherein said evaluation means includes an oscilloscope coupled to said photo detector for displaying the frequency characteristics of the superimposed light beams as an oscillogram.

22. The apparatus according to claim 5 further including an elongated housing having a pair of opposed ends, said housing having means for coupling said housing to said light source at one of said ends, said other end having aperture means emitting the irradiation light beam and having said forming means for said reflected light beam; said beam dividing means, and at least a portion of said evaluation means being located within said housing.

23. The apparatus according to claim 14 further including an elongated housing having a pair of opposed ends, said housing having means for coupling said housing to said light source at one of said ends, said other end having aperture means emitting the irradiation beam; said beam dividing means, and at least a portion of said evaluation means being located within said housing; said aperture means including said convex lens and means for moving said convex lens relative to said housing toward and away from the web of textile goods.

24. The apparatus according to claim 5 wherein said light source generates said beam of laser light along a line of generation and wherein said reflection means comprises a mirror system interposed between said beam dividing means and said evaluation means, said mirror system reflecting said deflected light beam along a path having a plurality of segments, at least one of which lies parallel to the line of generation of the beam of laser light.

25. The apparatus according to claim 5 further defined as one for measuring the velocity of a web at a plurality of locations or measuring the velocity of a plurality of webs, said apparatus comprising at least one light source, a plurality of beam dividing means for irradiating a web at a plurality of locations or irradiating a plurality of webs, and a plurality of intensity reducing means, and wherein said evaluating means has a single photo detector for each pair of reference and reflected light beams for providing an indication of the velocities of a web at a plurality of locations or of a plurality of webs.

26. The apparatus according to claim 25 wherein said evaluation means includes an oscilloscope coupled to said photo detectors.

27. The apparatus according to claim 25 further defined as one for controlling the velocity of a web at at least a pair of locations or controlling the velocity of at least a pair of webs, the velocities of the web or webs being established by a plurality of motive power means, and wherein said evaluating means provides output signals to said motive power means for controlling the velocities of said web or webs.

* * * * *